(12) United States Patent
Phan et al.

(10) Patent No.: US 10,570,023 B2
(45) Date of Patent: Feb. 25, 2020

(54) WATER FILTRATION SYSTEMS AND METHODS

(71) Applicant: Minh Van Phan, Laguna Hills, CA (US)

(72) Inventors: Minh Van Phan, Laguna Hills, CA (US); Jesse Vi Phan, Laguna Hills, CA (US)

( * ) Notice: Subject to any disclaimer, the term of this patent is extended or adjusted under 35 U.S.C. 154(b) by 318 days.

(21) Appl. No.: 15/799,965

(22) Filed: Oct. 31, 2017

(65) Prior Publication Data

US 2018/0118578 A1   May 3, 2018

Related U.S. Application Data

(60) Provisional application No. 62/415,738, filed on Nov. 1, 2016.

(51) Int. Cl.
*C02F 1/00* (2006.01)
*C02F 1/28* (2006.01)

(52) U.S. Cl.
CPC .............. *C02F 1/003* (2013.01); *C02F 1/283* (2013.01); *C02F 2201/006* (2013.01); *C02F 2307/04* (2013.01)

(58) Field of Classification Search
CPC .............. C02F 1/003; C02F 2201/006; C02F 2307/04; C02F 1/283; C02F 2201/007; C02F 2307/02; C02F 1/002; F03B 13/00; Y02P 70/525; B01D 46/0038; B01D 2253/102; B01D 53/02; B01D 29/114; B01D 35/14; B25J 9/1697; B29C 66/71; B01J 20/28028; B67D 7/005
See application file for complete search history.

(56) References Cited

U.S. PATENT DOCUMENTS

| | | | | |
|---|---|---|---|---|
| 5,914,045 | A * | 6/1999 | Palmer | C02F 1/003 210/136 |
| 6,565,742 | B1 * | 5/2003 | Gentry | C10G 21/00 208/311 |
| 2002/0092813 | A1 * | 7/2002 | Radford | C02F 1/003 210/767 |
| 2002/0170921 | A1 * | 11/2002 | Tan | B67D 1/1247 222/67 |

* cited by examiner

*Primary Examiner* — Ana M Fortuna
(74) *Attorney, Agent, or Firm* — Cionca IP Law P.C.; Marin Cionca (57) ABSTRACT

A water filtration system having an adapter portion defining a hollow interior adapter space; and having a first threaded portion and being configured to receive a water filter having a second threaded portion; at least a nut configured to secure the system to a container by being screwed onto the first threaded portion; at least one washer fitted onto the adapter portion and configured to prevent leaks from the container; the water filter having an exterior surface configured to absorb into a hollow interior filter space unfiltered water placed into the container by having a coconut carbon filter; the hollow interior filter space having filtration media configured to remove contaminants such that the unfiltered water becomes filtered water; the water filter further configured to allow the filtered water to drain out of the water filter by gravity, such that the filtered water exits the system and into a receiving container.

16 Claims, 5 Drawing Sheets

WATER FILTRATION SYSTEMS AND METHODS

CROSS-REFERENCE TO RELATED APPLICATIONS

This application claims the benefit of U.S. Provisional Application No. 62/415,738, filed Nov. 1, 2016, which is hereby incorporated by reference, to the extent that it is not conflicting with the present application.

BACKGROUND OF INVENTION

1. Field of the Invention

The invention relates generally to water filtration and more specifically to portable water filtration.

2. Description of the Related Art

Accessibility of clean water is vital, as many diseases result from contaminated water. The availability of clean water is limited for many people, but even populations who ordinarily have access to clean water may find that accessing it is difficult in emergency or disaster situations. Many existing filtration systems are heavy, cumbersome, or require electricity or another power source to function. Many other existing filtration systems are expensive, and most systems can only be used for certain types of water containers. Therefore, there is a need for a portable, simple, affordable, and non-electronic water filtration system that may be used for a variety of water containers, without the need for an external energy source, pump, and is not reliant on water pressure.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a water filtration system is provided, the system having a cylindrical adapter portion having a first adapter end and a second adapter end, the adapter portion defining a hollow interior adapter space; the first adapter end having a pointed tip; the second adapter end having a first threaded portion and being configured to receive a water filter having a corresponding second threaded portion; the pointed tip being configured to drill a hole into a water container, and the pointed tip comprising a plurality of drain holes such that an interior tip space is in communication with the hollow interior adapter space; at least a nut configured to secure the water filtration system to the water container by being screwed onto the first threaded portion; at least one washer fitted onto the adapter portion and against an interior side or an exterior side of the water container and configured to prevent leaks from the water container by being constructed from a waterproof material; the water filter having an exterior surface configured to absorb into a hollow interior filter space unfiltered water placed into the water container by having a coconut carbon filter; the hollow interior filter space having filtration media configured to remove contaminants from the unfiltered water such that the unfiltered water becomes filtered water; the hollow interior filter space further comprising a filter cylinder configured to take in the filtered water and direct the filtered water out of the water filter by gravity, such that the filtered water exits the water filtration system and into a receiving container. Thus, an advantage is that no electricity is needed to filter water and no additional tools are needed for adapting any water container into a container capable of receiving the water filtration system.

In another aspect, a water filtration system is provided, the system having a cylindrical adapter portion having a first adapter end and a second adapter end, the adapter portion defining a hollow interior adapter space; the first adapter end having a plurality of drain holes; the second adapter end having a first threaded portion and being configured to receive a water filter having a corresponding second threaded portion; at least a nut configured to secure the water filtration system to a water container by being screwed onto the first threaded portion; at least one washer fitted onto the adapter portion and against an interior side or an exterior side of the water container and configured to prevent leaks from the water container by being constructed from a waterproof material; the water filter having an exterior surface configured to absorb into a hollow interior filter space unfiltered water placed into the water container by having a coconut carbon filter; the hollow interior filter space having filtration media configured to remove contaminants from the unfiltered water such that the unfiltered water becomes filtered water; the water filter further configured to allow the filtered water to drain out of the water filter by gravity, such that the filtered water exits the water filtration system and into a receiving container. Thus, an advantage again is that no electricity is needed to filter water.

In another aspect, a method of filtering water using a water filtration system is provided, the water filtration system having a water filter adapter having a cylindrical adapter portion having a first adapter end and a second adapter end, the adapter portion defining a hollow interior adapter space; a pointed tip on the first adapter end; the second adapter end having a first threaded portion and being configured to receive a water filter having a corresponding second threaded portion; the pointed tip being configured to drill a hole into a water container, and the pointed tip comprising a plurality of holes such that an interior tip space is in communication with the hollow interior adapter space; at least a nut configured to secure the water filtration system to the water container by being screwed onto the first threaded portion; at least one washer fitted onto the adapter portion and configured to prevent leaks from the water container by being constructed from a waterproof material; the water filter having an exterior surface configured to absorb into a hollow interior filter space unfiltered water placed into the water container by having a coconut carbon filter; the hollow interior filter space having filtration media configured to remove contaminants from the unfiltered water such that the unfiltered water becomes filtered water; the water filter further configured to allow the filtered water to drain out of the water filter by gravity, such that the filtered water exits the water filtration system and into a receiving container; the method comprising the steps of: placing the water filter adapter into a hole in the water container; tightening the nut onto the surface of the water container to secure the water filter adapter in place; placing a first washer onto an exterior bottom surface of the water container; placing a second washer onto an interior bottom surface of the water container; threading a water filter into the first threaded portion; placing the receiving container underneath the water filtration system; filling the water container with the unfiltered water; and draining the filtered water into the receiving container. Thus, an advantage again is that no electricity is needed to filter water and no additional tools are needed for adapting any water container into a container capable of receiving the water filtration system.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 104 and 204, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1:
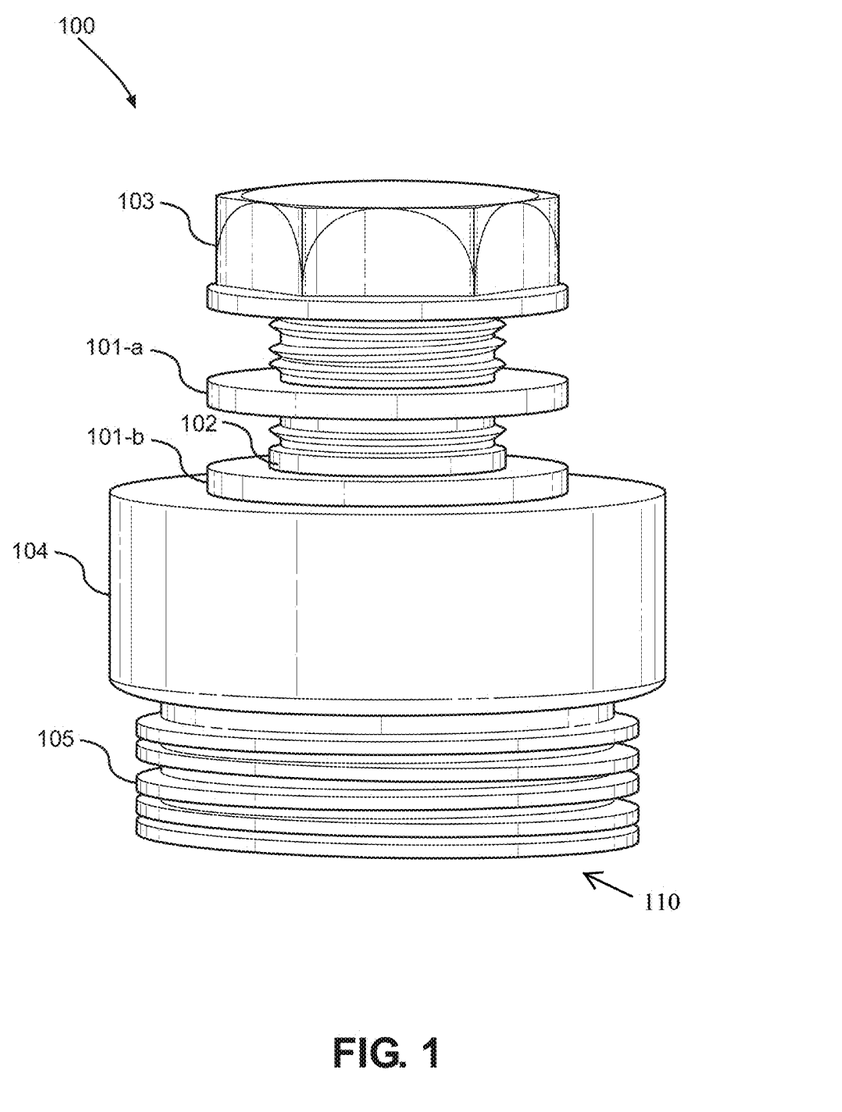
FIG. 1 shows the side view of a universal water filter adapter that may be used as part of a water filtration system, according to an aspect.

FIG. 1 shows the side view of a universal water filter adapter ("universal water filter adapter," "water filter adapter," or "adapter") 100 that may be used as part of a water filtration system, according to an aspect. The universal water filter adapter 100 may be constructed from plastic, stainless steel, carbon fiber, or any other suitable durable and waterproof material. The universal water filter adapter 100 may be constructed to receive a water filter (as shown by 206 in FIG. 2) to make up a water filtration system, for example. As an example, a water filter may be screwed into the bottom end 110 of the adapter 100. The adapter 100 may then be fitted into the bottom of any existing container such that water can be filtered and clean water can exit through the bottom of the container via the water filter system into a fresh, clean container, and the force of gravity may facilitate the flow of water through the water filter such that no electricity, pump, or any other external energy source is needed to filter the water. The water filter adapter may be secured onto the water container by tightening a nut 104, for example, fitted on the tube portion 102, and screwing the nut onto the water container. As an example, a single nut may be used, or a second hex nut 103 may be used to secure the water filter adapter from both the interior of the water container and the exterior of the water container. The water filter adapter with a filter may then be used for daily or emergency use when clean water is needed. Water may flow through a hollow tube portion 102 of the adapter 100 and into a receiving container (as shown by 220 in FIG. 2). Washers 101-$a$ and 101-$b$ fitted onto the tube portion 102 may be constructed of rubber or silicone, for example, or any other suitable material, and may be used to prevent leaks. The adapter 100 may include a threaded portion 105 at the bottom end 110 of the adapter, such that the adapter 100 can receive a water filter, or such that a water filter may be screwed onto the adapter. Thus, the water filter may be easily and quickly replaced or changed out for a new filter when necessary.

Figure 2:
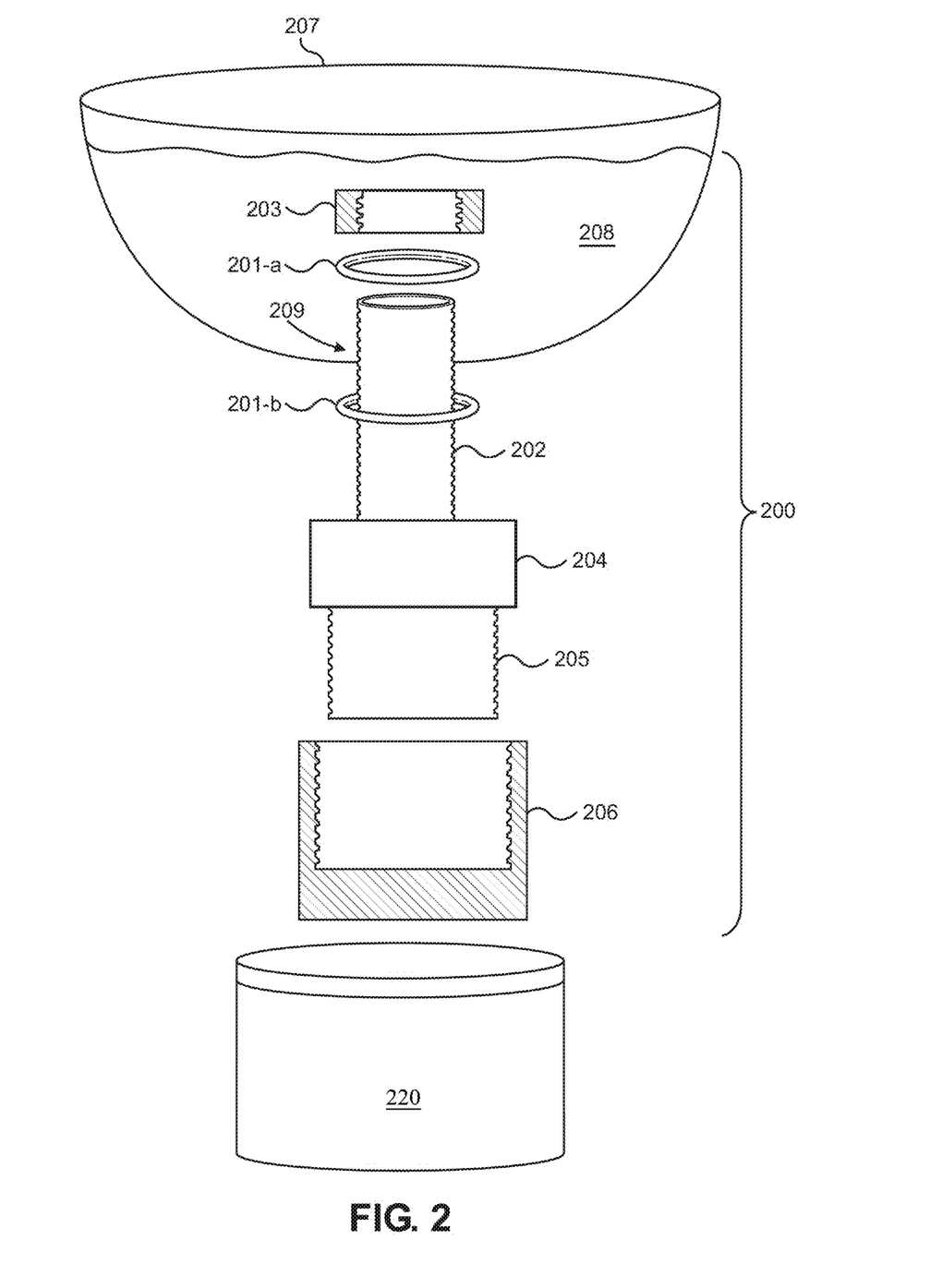
FIG. 2 illustrates an exploded sectional side view of a universal water filter adapter, according to an aspect.

FIG. 2 illustrates an exploded sectional side view of a universal water filter adapter 200, according to an aspect. The tube portion 202 of the adapter may be fitted into a hole 209 in the underside of any water container ("water container," or "container") 207. A hole 209 may be drilled into a container 207, and the hole 209 may be sized to fit the size of the tube portion 202 of the adapter. The top washer 201-$a$ may be fitted onto the tube snugly onto one side (inside) of the container 207 and the bottom washer 201-$b$ may be fitted snugly onto the tube on the other side (outside) of the container 207, which may prevent leaks. The tube portion 202 may be secured into place in the container by a hex nut 203, for example, or any other suitable means, inside of the container 207, and may also be secured on the opposite side by another nut 204. The bottom portion 205 of the adapter may include threads such that a water filter 206 may be screwed in and attached to the adapter. The water filter may, for example, be a coconut carbon filter, which may be a solid block filter for absorbing and filtering unfiltered water that passes through it. Again, an advantage may be that electricity or pressure may not be needed for the filtration of water when using the water filter adapter 200.

As an example, a first water container 207 may be adapted for using a water filter 206 by carrying out the following exemplary process. A hole 209 sized to fit the tube portion 202 is drilled into the bottom of the water container 207. The hole may be, for example, approximately ¾-inch in diameter to accommodate a water filter adapter 200 having a tube portion 202 with a substantially similar diameter. The universal water filter adapter 200 is fitted into the hole. Two washers are added to the universal water filter adapter 200. The first washer 201-*a* is fitted onto the top of the adapter, on the inside of the container 207, and secured by a hex nut 203, and the second washer 201-*b* is fitted onto the bottom of the adapter, on the outside of the container 207. A water filter 206 is screwed into the bottom threaded portion 205 of the adapter 200. Unfiltered water 208 may be placed into the first container 207 and may then flow into the hollow tube 202 and down into the filter 206. Water being filtered ("source water") 208 may exit the filter 206 and into a clean second, receiving container 220 below.

Figure 3:
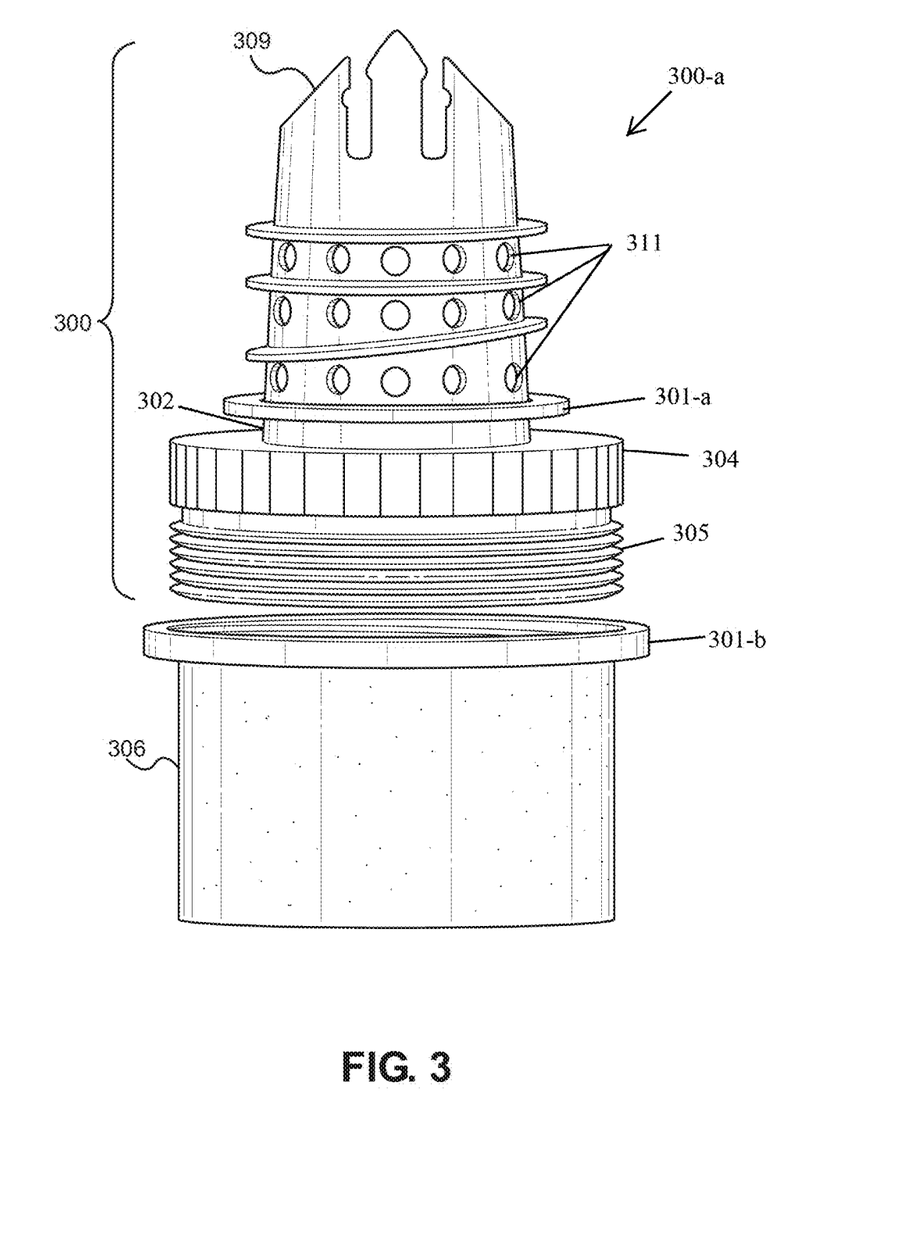
FIG. 3 illustrates the side view of another example of a universal water filter adapter provided in one piece, according to an aspect.

FIG. 3 illustrates the side view of another example of a universal water filter adapter provided in one piece ("one-piece universal water filter adapter," "one-piece water filter adapter," or "one-piece adapter") 300-*a,* according to an aspect. A one-piece adapter may include a pointed tip 312 for ease of drilling a hole into the first water container without the need for any additional drilling tools. The tube portion may be constructed similarly as shown in FIGS. 1-2 or may also be constructed with a threaded portion 305, and may be hollow to allow water flow. The pointed tip 312 may be solid, and the tube portion 302 may also include holes 311 for water to flow through. The pointed tip 312 may be solid or may be hollow, and the tube portion may be constructed with or without holes. The holes 311 may allow for water to be taken into the hollow interior space of the water filter adapter, to be filtered and then to be drained out of the water filter. The one-piece adapter 300-*a* may be capable of being secured into the water container without the need for an additional hex nut and may be used with a washer or with a plurality of washers 301-*a* and 301-*b* to help prevent leaks. The one-piece adapter 300-*a* may be constructed from steel, plastic, carbon fiber, or any other suitable materials.

Figure 4A:
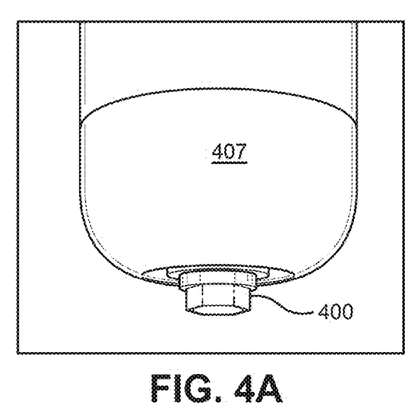
FIGS. 4A-4D show side views of examples of containers that may be used with a universal water filter adapter, according to an aspect.
Figure 4B:
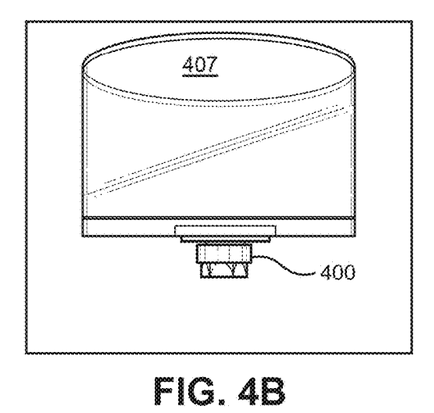
Figure 4C:
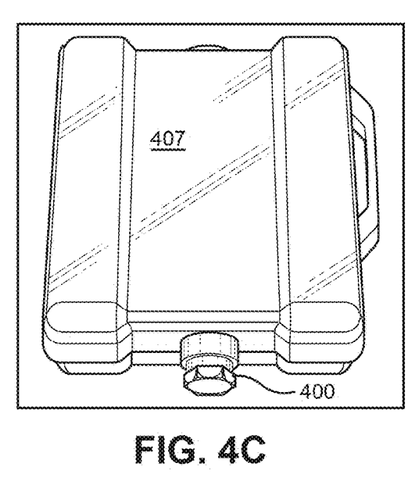
Figure 4D:
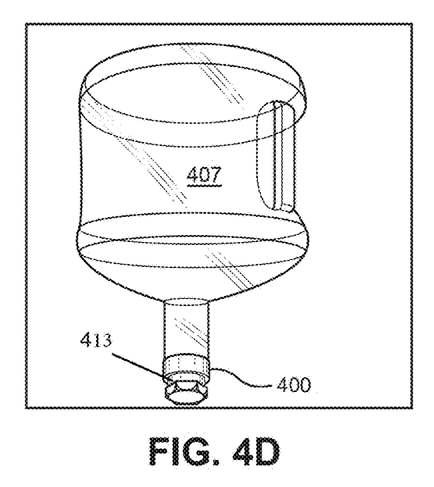

FIGS. 4A-4D show side views of examples of containers that may be used with a universal water filter adapter 400, according to an aspect. A container such as the examples shown by 407 in FIGS. 4A-4D may have a drilled hole in the bottom in order to receive a water filter adapter 400. As another example, a container having an open mouth 413 for dispensing water may also receive a water filter adapter 400 into the mouth 413 if the water container is turned upside-down, as shown in FIG. 4D.

Figure 5:
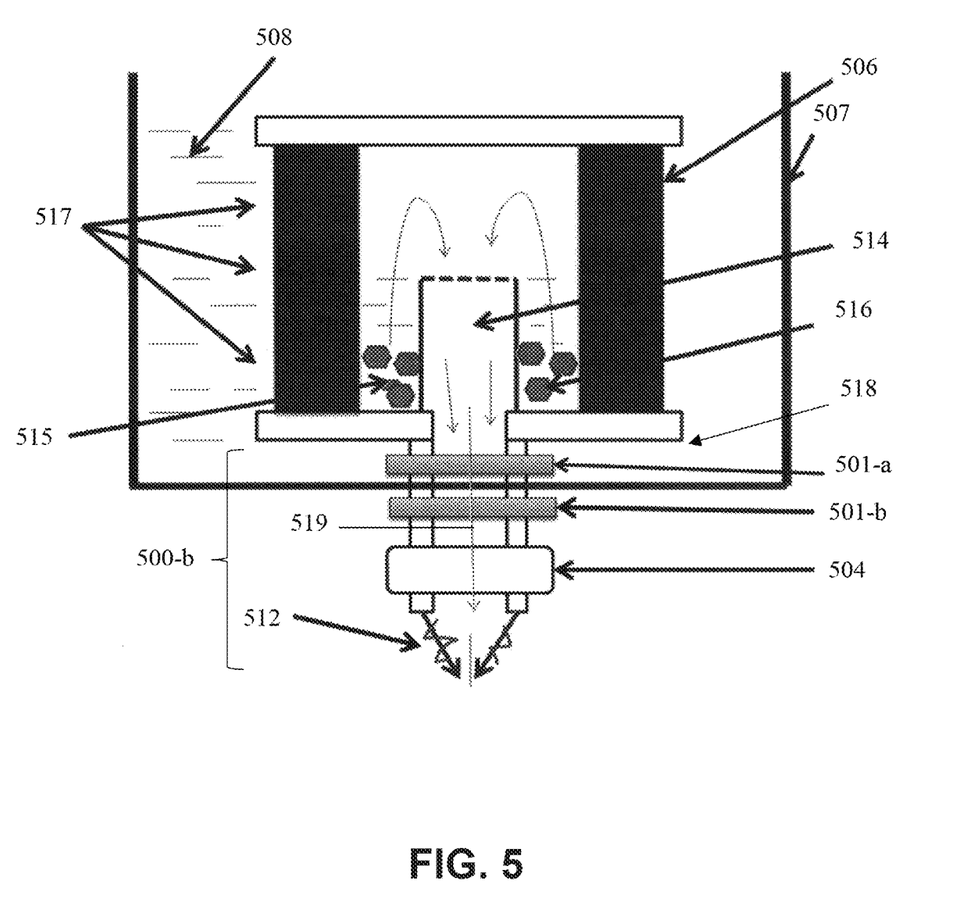
FIG. 5 illustrates a side sectional view of another example of a water filter adapter having a time-delay feature inserted into a first water container, according to an aspect.

FIG. 5 illustrates a side sectional view of another example of a water filter adapter having a time-delay feature ("time-delay adapter," or "time-delay water filter adapter") 500-*b* inserted into a first water container 507, according to an aspect. The time-delay water filter adapter 500-*b* may have a filter 506 attached or received into it. As an example, the time-delay water filter adapter 500-*b* may be provided with a pointed tip 512, which may be provided at the bottom end 518 of the adapter such that the adapter may be used to drill a hole into the water container 507 from the inside. A water filter adapter such as the example shown as 500-*b* may be provided with a pointed tip 512 at either its top end as shown in FIG. 3, or at the bottom end as shown in FIG. 5. Again, the time-delay water filter adapter 500-*b* may be secured into the bottom of the water container 507 with a nut 504, and may be secured on both the inside and outside of the water container 507, or may only need a nut 504 on the outside of the container as shown in FIG. 5. The hole in the water container 507 may be sealed using washers 501-*a* and 501-*b,* which may, for example, be constructed from rubber or any other suitable material. The washers may be used to prevent leaks and also prevent any unfiltered water 508 from draining into the receiving container. Unfiltered water 508 inside of the water container 507 may be absorbed into the surface 517 of the water filter.

The inside of the time-delay adapter 500-*b* may include a space 515 for filtration media 516, and a time-delay cylinder ("time-delay cylinder," or "filter cylinder") 514 for better filtration of water. In existing or known water filtration systems, the water being filtered may not be in contact with the filter for a long enough period of time for processing, or to be filtered properly. The time-delay cylinder may slow the water flow to allow for the water being filtered to have more time to be in contact with filtration media. Thus, the inclusion of a time-delay cylinder may allow for a two-step filtration process; first, the water may be filtered by going through a block filter, which may be a coconut filter, and then going through the time-delay cylinder. When flowing through the time-delay cylinder, the water may come into contact with, for example, proprietary medias such as X-Chlo, X-Chems, Pro-Ionic, or Alka Plus, such that the bacteria, chlorine, odor, or other present contaminants may be properly dissolved or removed from the water, before the water is overflown through to the second receiving container. The time-delay cylinder may be submerged into filtration media, and the time-delay cylinder be provided with holes to allow the surrounding media to dissolve any contaminants that may be present in the water being filtered. Then, the water may flow down through to a receiving container by gravity, as shown by arrow 519, and may flow out of holes in the pointed tip 512.

As an example, filtration media provided with the water filter adapter may be used for improving the alkaline level of the water being filtered. After the process of removing contaminants from the water, using, for example, ionic absorption micron technology, the media can then enhance the alkalinity of the water by retaining beneficial trace minerals. The filtration media may also be used to remove bacteria, viruses, or other contaminants. An example of filtration media that may be used with the water filter adapter is a porous, BPA-free plastic microfilter that is infused with finely granulated and activated coconut carbon, which may be combined with other types of adsorbing media, and may be selected for their ability to enhance the pH of the water, or for their ability to remove or reduce potentially harmful contaminants such as bacteria or viruses. Again, examples of such medias may include X-Chlo, X-Chems, Pro-Ionic, and Alka Plus, which are proprietary absorbing media. Removal of contaminants by carbon is a surface phenomenon known as absorption, and results from the molecular attraction of substances to the surface of the carbon. A controlled 1-micron filter may be used with the water filter adapter, and the 1-micron filter may contain thousands of interconnected Omni-directional pores that result in a "tortuous path" for superior analytic reduction. This may be done by forcing the source water through the filter of the water filter adapter, such that contaminants and pollutants are removed while leaving behind beneficial trace minerals such as calcium, magnesium, and potassium. The ionic absorption micron filtration may coordinate these processes of contaminant reduction by absorption, chemical bonding, chelation, and depth filtration.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A water filtration system comprising:
   a cylindrical adapter portion having a first adapter end and a second adapter end, the adapter portion defining a hollow interior adapter space;
   the first adapter end having a pointed tip;
   the second adapter end having a first threaded portion and being configured to receive a water filter having a corresponding second threaded portion;
   the pointed tip being configured to drill a hole into a water container, and the pointed tip comprising a plurality of drain holes such that an interior tip space is in communication with the hollow interior adapter space;
   at least a nut configured to secure the water filtration system to the water container by being screwed onto the first threaded portion;
   at least one washer fitted onto the adapter portion and against an interior side or an exterior side of the water container and configured to prevent leaks from the water container by being constructed from a waterproof material;
   the water filter having an exterior surface configured to absorb into a hollow interior filter space unfiltered water placed into the water container by having a coconut carbon filter through which the unfiltered water passes as a first filtration step;
   the hollow interior filter space having filtration media configured to remove contaminants from the unfiltered water as a second filtration step such that the unfiltered water becomes filtered water;
   the hollow interior filter space further comprising a filter cylinder configured to take in the filtered water and direct the filtered water out of the water filter by gravity, such that the filtered water exits the water filtration system and into a receiving container.

2. The water filtration system of claim 1, wherein the at least a nut is two hex nuts.

3. The water filtration system of claim 1, wherein the waterproof material of the at least one washer is rubber.

4. The water filtration system of claim 1, wherein the cylindrical adapter portion is constructed from plastic.

5. The water filtration system of claim 1, wherein the flow of water begins in the water filter and is directed out of the water filtration system through the pointed tip.

6. The water filtration system of claim 1, wherein the flow of water begins in the pointed tip and is directed out of the water filtration system through an end of the water filter.

7. A water filtration system comprising:
   a cylindrical adapter portion having a first adapter end and a second adapter end, the adapter portion defining a hollow interior adapter space;
   the first adapter end having a pointed tip and having having a plurality of drain holes;
   the second adapter end having a first threaded portion and being configured to receive a water filter having a corresponding second threaded portion;
   at least a nut configured to secure the water filtration system to a water container by being screwed onto the first threaded portion;
   at least one washer fitted onto the adapter portion and against an interior side or an exterior side of the water container and configured to prevent leaks from the water container by being constructed from a waterproof material;

the water filter having an exterior surface configured to absorb into a hollow interior filter space unfiltered water placed into the water container by having a coconut carbon filter;

the hollow interior filter space having filtration media configured to remove contaminants from the unfiltered water such that the unfiltered water becomes filtered water;

the water filter further configured to allow the filtered water to drain out of the water filter by gravity, such that the filtered water exits the water filtration system and into a receiving container.

8. The water filtration system of claim 7, wherein the at least a nut is two hex nuts.

9. The water filtration system of claim 7, wherein the waterproof material of the at least one washer is rubber.

10. The water filtration system of claim 7, wherein the flow of water begins in the water filter and is directed out of the water filtration system through the first adapter end.

11. The water filtration system of claim 7, wherein the flow of water begins in the first adapter end and is directed out of the water filtration system through an end of the water filter.

12. A method of filtering water using a water filtration system comprising: a water filter adapter having a cylindrical adapter portion having a first adapter end and a second adapter end, the adapter portion defining a hollow interior adapter space;

a pointed tip on the first adapter end;

the second adapter end having a first threaded portion and being configured to receive a water filter having a corresponding second threaded portion;

the pointed tip being configured to drill a hole into a water container, and the pointed tip comprising a plurality of holes such that an interior tip space is in communication with the hollow interior adapter space;

at least a nut configured to secure the water filtration system to the water container by being screwed onto the first threaded portion;

at least one washer fitted onto the adapter portion and configured to prevent leaks from the water container by being constructed from a waterproof material;

the water filter having an exterior surface configured to absorb into a hollow interior filter space unfiltered water placed into the water container by having a coconut carbon filter;

the hollow interior filter space having filtration media configured to remove contaminants from the unfiltered water such that the unfiltered water becomes filtered water;

the water filter further configured to allow the filtered water to drain out of the water filter by gravity, such that the filtered water exits the water filtration system and into a receiving container;

the method comprising the steps of:

placing the water filter adapter into a hole in the water container;

tightening the nut onto the surface of the water container to secure the water filter adapter in place;

placing a first washer onto an exterior bottom surface of the water container;

placing a second washer onto an interior bottom surface of the water container;

threading a water filter into the first threaded portion;

placing the receiving container underneath the water filtration system;

filling the water container with the unfiltered water; and draining the filtered water into the receiving container.

13. The method of claim 12, wherein the hole is a mouth of the water container.

14. The method of claim 13, wherein the first washer and the second washer are selected to stop any leaks from the mouth of the water container when a diameter of the water filter adapter is smaller than the mouth of the water container.

15. The method of claim 12, wherein the hole is created by a user and further comprising the steps of:

drilling a hole into the water container by placing the pointed tip onto a bottom surface of the water container and applying a force; and enlarging the hole such that a diameter of the water filter adapter fits snugly into the hole.

16. The method of claim 12, wherein the hollow interior filter space of the water filter further comprises a filter cylinder configured to take in the filtered water and direct the filtered water out of the water filter by gravity.

* * * * *